United States Patent
Yamabuchi et al.

(10) Patent No.: US 6,243,024 B1
(45) Date of Patent: Jun. 5, 2001

(54) DEVICE FOR MONITORING SURROUNDINGS OF VEHICLE

(75) Inventors: Hiroshi Yamabuchi; Shinichi Honma, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,836

(22) Filed: Oct. 15, 1999

(30) Foreign Application Priority Data

May 28, 1999 (JP) .................................................. 11-150332

(51) Int. Cl.⁷ ...................................................... G08G 1/16
(52) U.S. Cl. .......................... 340/903; 343/872; 343/873; 361/600
(58) Field of Search ............................. 340/903; 343/872, 343/873; 342/70; 361/600; 701/301

(56) References Cited

U.S. PATENT DOCUMENTS

| 4,783,666 | * | 11/1988 | Ast et al. ............................... 343/872 |
| 5,325,096 | * | 6/1994 | Pakett ..................................... 342/70 |
| 5,339,075 | * | 8/1994 | Abst et al. ............................. 340/903 |
| 5,517,196 | * | 5/1996 | Pakett et al. ............................ 342/70 |
| 5,786,772 | * | 7/1998 | Schofield et al. ..................... 340/903 |

FOREIGN PATENT DOCUMENTS 54-45040    4/1979    (JP) .

* cited by examiner

*Primary Examiner*—Benjamin C. Lee
(74) *Attorney, Agent, or Firm*—Sughrue, Mion, Zinn, Macpeak & Seas, PLLC

(57) ABSTRACT

A radar system 100 is integrally accommodated in, for example, a door mounted exterior mirror case, wherein electromagnetic waves are emitted from a transmitting antenna 4 to an area of a right side and a backside of a driver's own vehicle; the electromagnetic waves reflected by objects are received by a receiving antenna 5; thus received waves are amplified by a receiving circuit 6; a Doppler frequency is measured; a situation of danger or safety is judged along with calculations of ranges and relative velocities from the objects in an operating circuit 2; a result of the judgement is displayed by LED7, 8; and a predetermined alarm and control is performed by a control circuit 9, equipped in a body of the own vehicle, based on information from the operating circuit 2, whereby detection of vehicles especially existing in an area being difficult for a driver to observe from a door mounted exterior mirror, for example that on a right back side of the own vehicle, are aided to detect.

12 Claims, 6 Drawing Sheets

7: DISPLAY LED (GREEN)
8: DISPLAY LED (RED)

DEVICE FOR MONITORING SURROUNDINGS OF VEHICLE

BACKGROUND OF THE INVENTION

1. Field of the Invention

The present invention relates to a device for monitoring surroundings of a vehicle, a particularly to, the device mounted on a door mounted exterior mirror for detecting existence of a passing-over vehicle, a translation vehicle, or the like over a range between a rear and sides of lanes adjacent to a lane where a driver's own vehicle runs, in order to judge, for example, whether or not it is safe to change or join a main track, and also to constantly monitor safety in this range and presence of obstacles, such as vehicles.

2. Discussion of Background

In a conventional technique, it is proposed that a radar device is widely used for a device for monitoring surroundings of a vehicle, a device for controlling following-on distance and so on, equipped in vehicles. The radar device equipped in the device for monitoring surroundings of a vehicle has a structure including a fender mounted exterior mirror and a fender, as disclosed in, for example, JP-A-54-45040.

However, in recent years, it is very rare that fender mounted exterior mirrors are equipped in generally manufactured passenger cars, and door mounted exterior mirrors are equipped in almost all of passenger cars.

Further, in the above JP-A-54-45040 utilizing the fender mounted exterior mirror, a radar is formed by an independent unit separated from the fender mounted exterior mirror, wherein a specific structure that the fender houses receiving the radar is required in a vehicle body, and therefore the structure becomes complicated.

In case that a single antenna is commonly used instead of a transmitting antenna and a receiving antenna, it is necessary to provide an isolator in an electric circuit for preventing propagation of transmitted electromagnetic waves from directly turning toward a circuit of receiving system. In this, the isolator is a switch called a circulator, which is operated at a relatively high speed for separating reception from transmission in a time sequence.

Further, a visible range by a door mounted exterior mirror is generally about 25 degrees in horizontal directions, and it is well known that a range other than the visible range becomes a blind spot. Especially, in adjacent lanes within a point-blank range, an object vehicle positioned relatively close to lanes next to the adjacent lanes, namely, a position relatively apart from a driver's own vehicle, is physically and completely enclosed in a blind spot and such an object vehicle is not reflected in the door mounted exterior mirrors. Under such a situation, it is very dangerous that the driver's own vehicle changes lanes. Therefore, a driver is ordinarily instructed to directly observe the blind spot for confirming safety by swinging his head just before changing lanes.

Further, miniaturization is required for these kinds of on-vehicle equipments, in a first priority. Therefore, it is necessary to optimize an arrangement of an antenna and a radome in a device for miniaturization.

SUMMARY OF THE INVENTION

It is an object of the present invention to solve the above-mentioned problems inherent in the conventional technique and to provide a device for monitoring surroundings of a vehicle having a simplified, miniaturized and space-saving structure.

According to a first aspect of the present invention, there is provided a device for monitoring surroundings of a vehicle comprising: a transmitting antenna having a predetermined directivity, an electromagnetic oscillating means for generating electromagnetic waves emitted from the transmitting antenna, a receiving antenna for receiving the electromagnetic waves reflected by an object, a means for receiving signals from the receiving antenna, measuring a range from the object based on a time difference between transmitting signals and receiving signals, and also measuring a relative velocity based on a Doppler frequency of the received electromagnetic waves, an operating means for judging a degree of a risk of a collision with the object based on the measurements by the above receiving and measuring means, and an alarm means for reporting the degree of the risk judged by the operating means.

According to a second aspect of the present invention, there is provided the device for monitoring surroundings of a vehicle according to the first aspect of the present invention, wherein the transmitting antenna and the receiving antenna are a commonly used single antenna, or the transmitting antenna and the receiving antenna are separate and independent each other.

According to a third aspect of the present invention, there is provided the device for monitoring surroundings of a vehicle according to the first or second aspect of the invention, wherein constitutional elements fabricating the device for monitoring surroundings of the vehicle are integrated.

According to a fourth aspect of the present invention, there is provided the device for monitoring surroundings of vehicle according to the first, second, or third aspect of the invention, wherein all of constitutional elements or at least the transmitting and receiving antennas of the device for monitoring surroundings of the vehicle are equipped in an inside of a door mounted exterior mirror or at a periphery of the door mounted exterior mirror.

According to a fifth aspect of the present invention, there is provided the device for monitoring surroundings of a vehicle according to the fourth aspect of the invention, wherein a range of emitting the electromagnetic waves from the transmitting antenna and receiving the waves reflected by the object in the receiving antenna includes a blind spot in a relatively point-blank range, where a driver cannot observe using the door mounted exterior mirror, and the range of emitting is a range of detecting the object, such as vehicles, approaching from a back of a driver's own vehicle in a relatively far range.

According to a sixth aspect of the present invention, there is provided the device for monitoring surroundings of vehicle according to the first, second, third, fourth, or fifth aspect of the invention, wherein a radome is provided in fronts of the transmitting and receiving antennas; and at least one of intervals, between an emitting surface of the electromagnetic waves of the transmitting antenna and an inner surface of the radome and between a receiving surface of the electromagnetic waves of the receiving antenna and the inner surface of the radome, has a size corresponding to one wavelength or a half wavelength of a period of the generated electromagnetic waves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 8 as follows, wherein the same numerical references are used for the same or similar portions and description of these portions is omitted.

Embodiment 1

Figure 1:
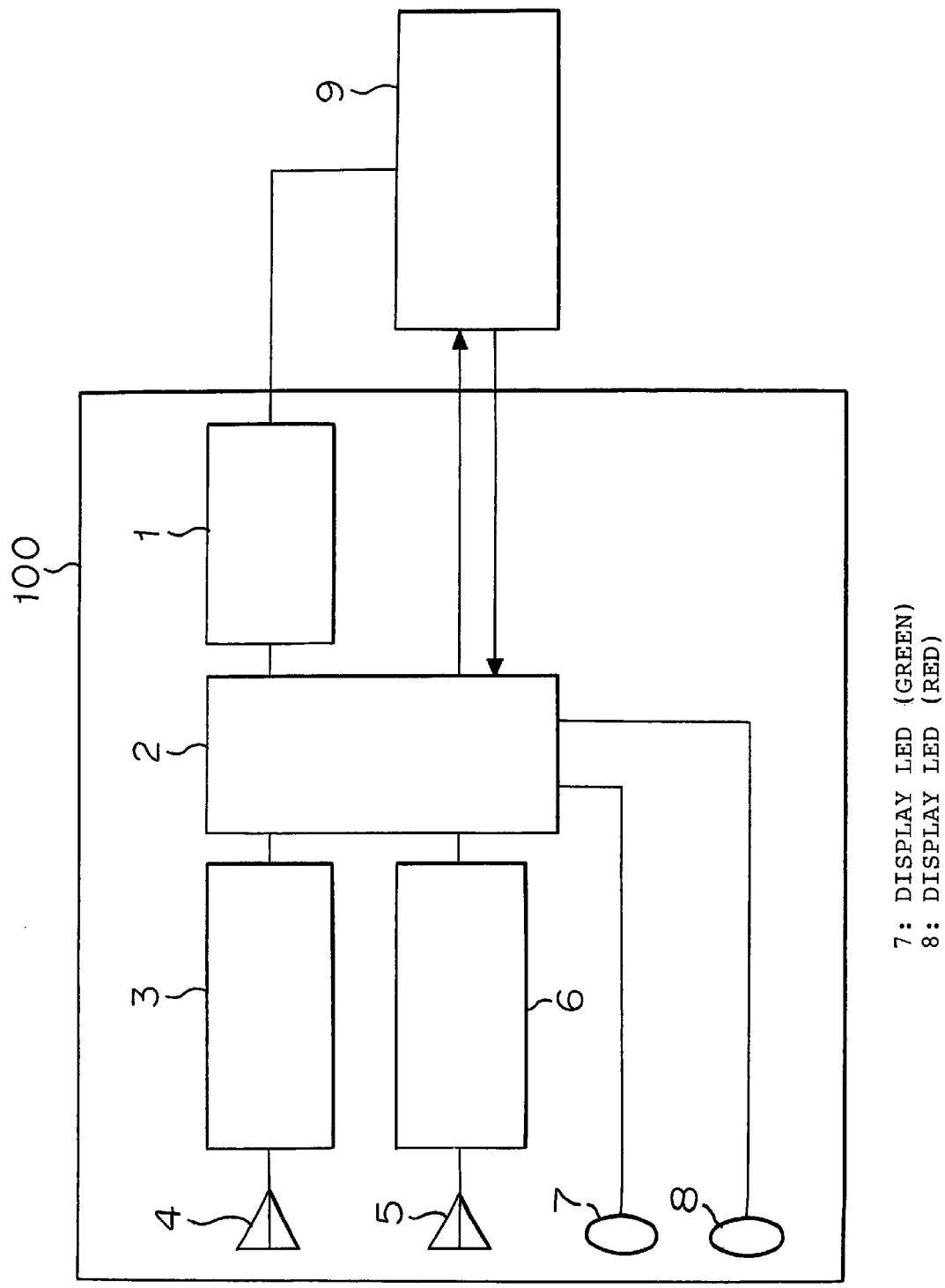
FIG. 1 is a block chart illustrating a structure of a device for monitoring surroundings of a vehicle according to Embodiment 1 of the present invention.

FIG. 1 is a block chart for illustrating a structure of a device for monitoring surroundings of a vehicle according to Embodiment 1 of the present invention. Such a device for monitoring surroundings of a vehicle is equipped in, for example, a door mounted exterior mirror for detecting an object such as a vehicle, running through a lane adjacent to where a driver's own vehicle runs.

In FIG. 1, numerical reference 100 designates a radar system; numeral reference 1 designates a power source for supplying a power to the entire radar system 100; numerical reference 2 designates an operating circuit for calculating a range from and a relative velocity of an object to be detected based on transmitting and receiving signals of the radar system and simultaneously judging dangerous and safe situations; numerical reference 3 designates an electromagnetic wave oscillating circuit for generating electromagnetic waves; numeral reference 4 designates a transmitting antenna having a directivity of emitting the electromagnetic waves over a range including at least blind spots of lanes adjacent to where the own vehicle runs; numerical reference 5 designates a receiving antenna, having a directivity similar to that of the transmitting antenna, for receiving the electromagnetic waves reflected by the object; and numerical reference 6 designates a receiving circuit for amplifying received signals and measuring a Doppler frequency of the received signal based on a frequency of the transmitted electromagnetic waves.

Numerical references 7 and 8 designate light emitting diodes (LED) for transmitting a result of the dangerous and safe situations judged by the operating circuit 2. Numerical reference 9 designates a control circuit provided on a body side of the vehicle for alerting and controlling by combining information outputted from the device for monitoring surroundings of vehicle and information stored in the vehicle (not shown).

In the circuit illustrated in FIG. 1, when electromagnetic waves from the electromagnetic wave oscillating circuit 3 are emitted from the transmitting antenna 4 and reflected by an object to be detected such as a vehicle, the reflected electromagnetic waves are received by the receiving antenna 5 and amplified by the receiving circuit 6, and a Doppler frequency of the reflected electromagnetic waves are measured. In the operating circuit 2, a range from the object to be detected and a relative velocity of the object to be detected are calculated and simultaneously it is judged whether or not the own vehicle is in dangerous and safe situations, wherein depending on a result of the judgement the LED 7 or 8 is lit. The control circuit 9 performs predetermined alarm and control in the body of the vehicle based on information from the operating circuit 2.

By constructing a circuit of the device for monitoring surroundings of vehicle as such, it is possible to monitor adjacent vehicles or vehicles running behind the own vehicle. The antennas may be substituted to a single antenna for receiving and transmitting. By separating and independently providing antennas for transmitting and receiving, it is not necessary to provide an isolator in an electric circuit for separating the transmitted and received signal waves while maintaining a good receiving condition.

Next, a case that the device for monitoring surroundings of a vehicle is built in an outer shell casing of a door mounted exterior mirror will be described.

Figure 2:
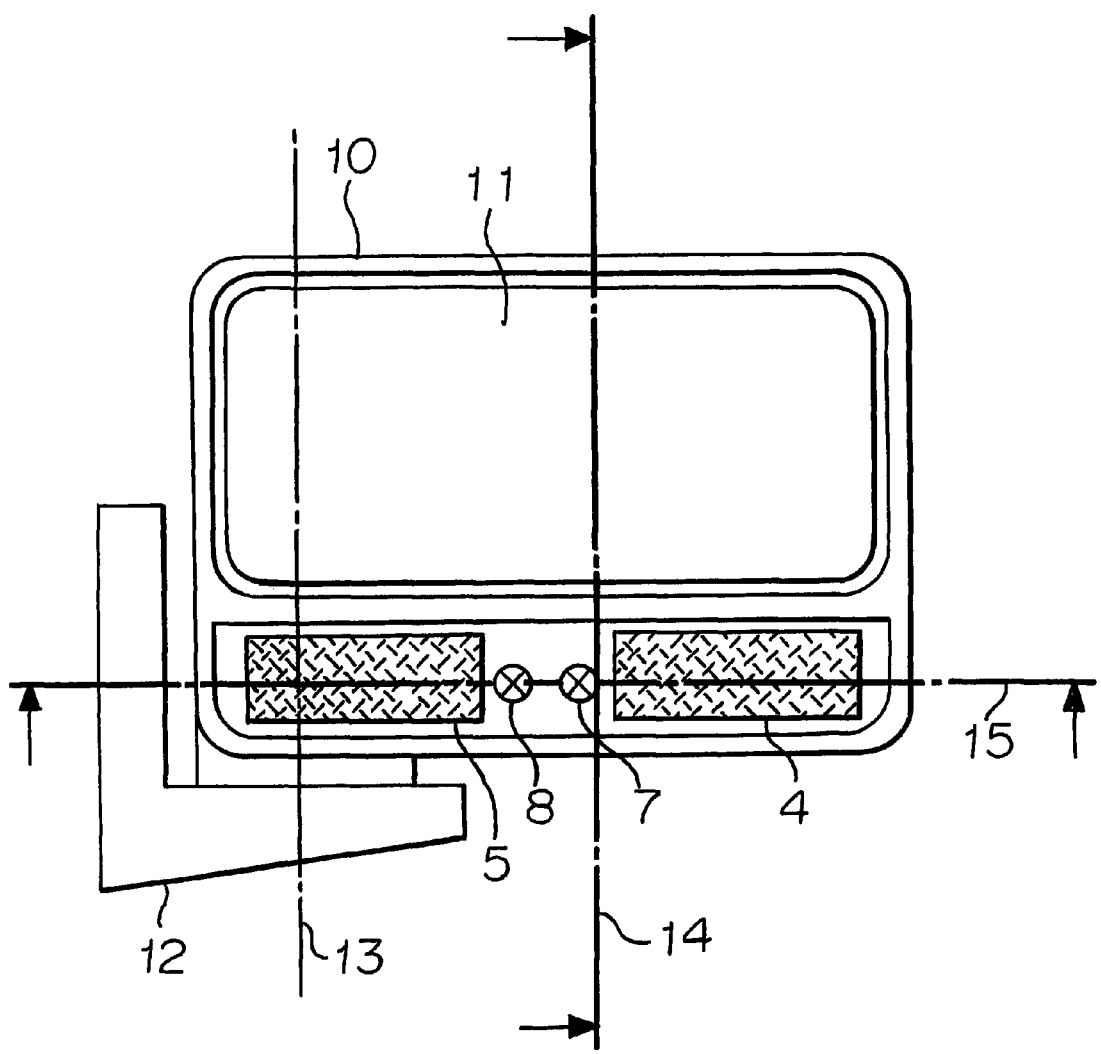
FIG. 2 is a front view of the device monitoring surroundings of a vehicle and an outer shell casing of door mounted exterior mirror accommodating the device according to Embodiment 1 of the present invention.

FIG. 2 is a front view of the device for monitoring surroundings of a vehicle accommodated in the outer shall casing of the door mounted exterior mirror according to Embodiment 1. In FIG. 2, numerical reference 10 designates the door mounted exterior mirror outer shell casing; numerical reference 11 designates a mirror; numerical reference 12 designates a supporting member fixing a body of a vehicle to the door mounted exterior mirror; and numerical reference 13 designates a rotational shaft of the door mounted exterior mirror for a tilting operation of the door mounted exterior mirror.

Figure 3:
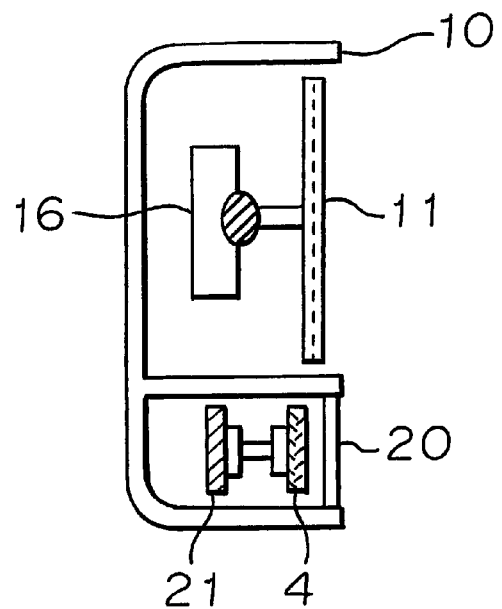
FIG. 3 is a lateral cross-sectional view of the device for monitoring surroundings of vehicle and the outer shell casing of the door mounted exterior mirror accommodating the device according to Embodiment 1 of the present invention.
Figure 4:
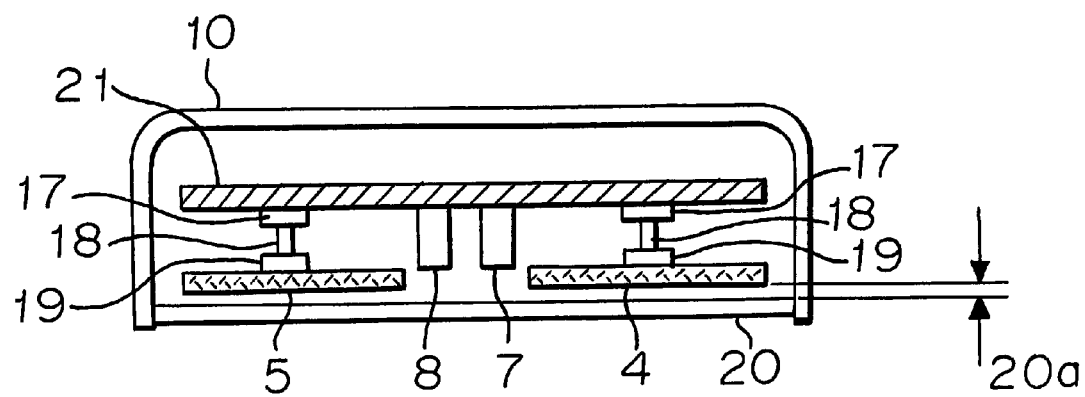
FIG. 4 is a longitudinal cross-sectional view of the device for monitoring surroundings of a vehicle and the outer shell casing of the door mounted exterior mirror accommodating the device according to Embodiment 1 of the present invention.

Numerical reference 14 is a line for showing a cross-sectional shape of the door mounted exterior mirror in a vertical direction on FIG. 3; and Numerical reference 15 designates a line for showing a cross-sectional shape in a horizontal direction on FIG. 4.

FIG. 3 is a cross-sectional shape in the vertical direction taken along the line 14 of FIG. 2, wherein numerical reference 16 designates a mirror adjusting mechanism composed of an actuator for adjusting an angle of the mirror 11 and a supporting member for fixing the actuator. Numerical reference 20 designates a radome, which enables penetration of electromagnetic waves and prevents rain water, dirt and so on from invading. Numerical reference 21 designates an integral substrate, integrally constituting a power source circuit 1, an operation circuit 2, an electromagnetic wave oscillating circuit 3, and a receiving circuit 6.

FIG. 4 shows a cross-sectional shape in a horizontal direction taken along the line 15 of FIG. 2, wherein numerical references 4 and 5 designate antennas; numerical references 18 designate cables for supplying and transmitting a power to the antennas 4, 5; numerical references 17 designate connectors provided in the integral substrate 21 for connecting with and fixing to the cables 18; and numerical references 19 designate connectors provided in bases of the antennas 4, 5 for connecting with and fixing to the cables 18.

Numerical reference 20a designates an interval between the antennas 4, 5 of generating electromagnetic waves and the radome 20, which interval corresponds to a wavelength.

Figure 5:
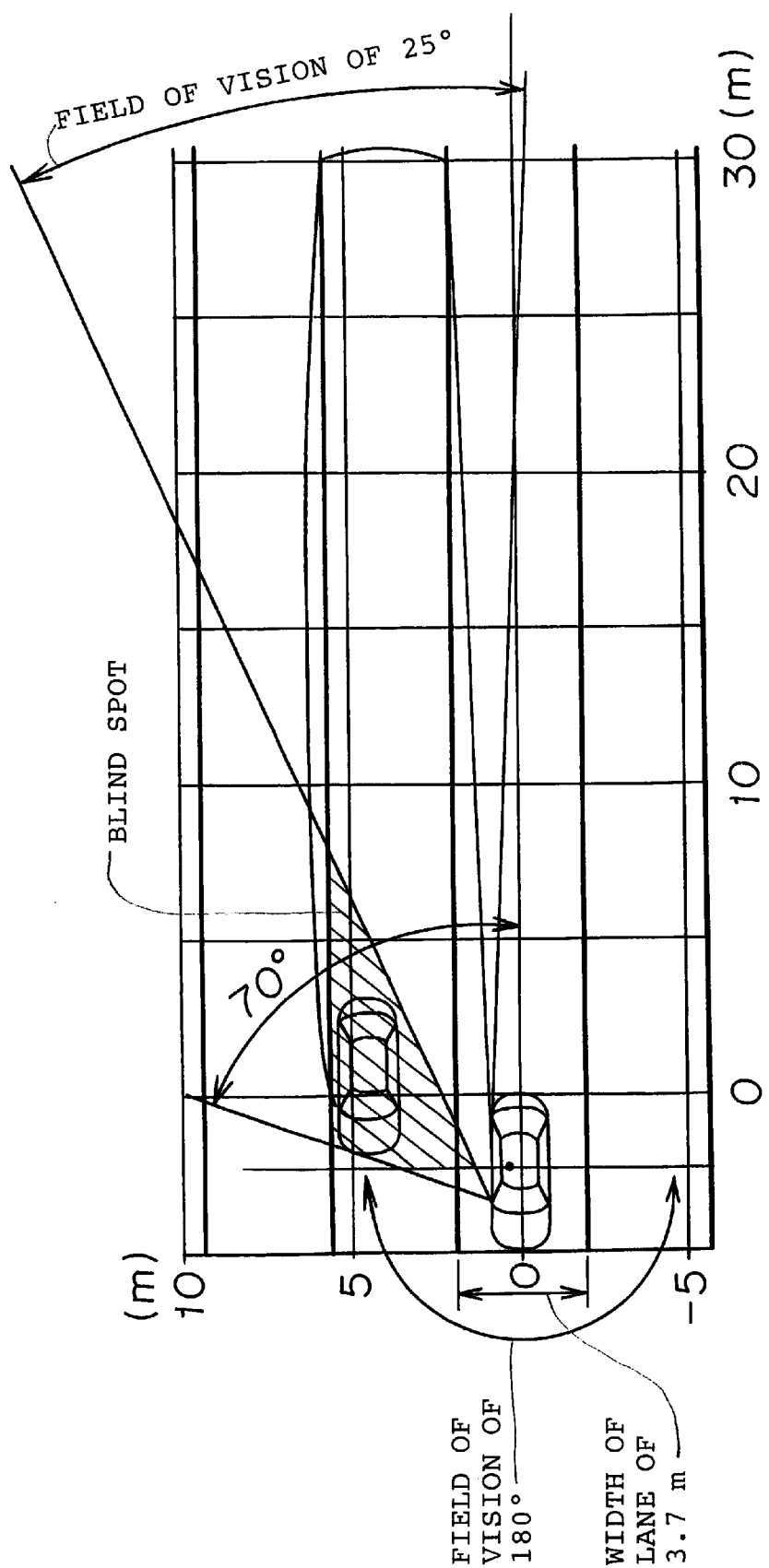
FIG. 5 is a chart illustrating a blank point and a field of view by the door mounted exterior mirror in case that the device for monitoring surroundings of vehicle is accommodated in the outer shell casing of the door mounted exterior mirror.

FIG. 5 illustrates a positional relationship and a detecting range of the device for monitoring surroundings of a vehicle according to Embodiment 1 in case that the device for monitoring is attached to the door mounted exterior mirror. Generally, it is possible to monitor over a standard value of about 25 degrees by a door mounted exterior mirror in horizontal directions. Incidentally, it is known that a field of vision of an ordinary driver is about a range of 180 degrees.

Based on these facts, in general, a blind spot, which is an area out of a monitoring range by both of a field of view by a driver and a field of view from a door mounted exterior mirror, geometrically exists. Further, a hatched portion of FIG. 5 is an area, where the above blind spot area and an adjacent lane are overlapped, wherein a vehicle existing in the adjacent lane in a relatively point-blank range with respect to an own vehicle is completely within the blind spot area.

Ordinarily, a driver confirms a back of the own vehicle from a door mounted exterior mirror at a time of changing lanes and further confirms a side by directly observing as learnt in a training for a driver's license. This means that the driver confirms whether or not an obstacle exists in the blind spot area of the hatched portion.

The antennas of the device for monitoring surroundings of vehicle according to the present invention provides an appropriate emitting pattern, e.g. about a standard angle of 70 degrees as in case of a passenger vehicle in FIG. 5 with a directivity of irradiating electromagnetic waves to at least the hatched blind spot area for monitoring. This directivity is adjusted for optimizing the emitting pattern using parameters of designing such as heading angles, the number of components, mutual intervals of patch antennas fabricating a flat-plane patch array antenna, and a power and a phase of a supplying electricity.

A reason why the intervals 20a between the antennas and the radome are one wavelength will be described in reference of FIG. 4. In case that an interval between an antenna, as a transmitting source of electromagnetic waves, and an inner surface of a radome constituting an outer shell of a device is relatively narrow, it is confirmed by experiments that components of the electromagnetic waves oscillated by the antenna and components of electromagnetic waves reflected by the inner surface of the radome are mutually interfered to disturb a desired emission pattern inherent in the antenna and to simultaneously deteriorate isolation between the transmitting antenna and the receiving antenna.

On the other hand, it is difficult to increase the interval between the antenna and the radome because miniaturization has a first priority in this kind of onboard device. Therefore, an influence to the emitting pattern of the antenna is reduced by rendering the interval between the antenna and the radome to be a size of about one wavelength of the oscillated electromagnetic waves.

Further, a similar effect to the above is obtainable by rendering the interval a half wavelength instead of the one wavelength.

As described, in Embodiment 1, the device according to the present invention is equipped in the door mounted exterior mirror projected to an outer space, whereby the device is mounted in a most preferable position for emitting electromagnetic waves around the own vehicle to monitor; and it is not necessary to use special structure and shape for mounting the device on the body, wherein it is possible to satisfy as a newly added onboard device difficult contradictory conditions of functionally repairing a most suitable position and of not affecting the body.

Accordingly, because the radar system, which is the device for monitoring surroundings of vehicle, and the door mounted exterior mirror are integrated, the device can be easily mounted. Further, a design of a vehicle body is not spoiled because an outer appearance of the door mounted exterior mirror, in the inside of which the device is installed, is not affected.

Further, in order to restrict an influence to the emitting pattern of antenna and to simultaneously miniaturize the device, the interval between the antenna and the radome is about a wavelength or a half wavelength.

Further, as a detecting area for obstacles, a blind spot area of the door mounted exterior mirror, in which safety should generally be confirmed by directly observing a side of the own vehicle by the driver at time of changing lanes, is constantly monitored, and simultaneously the device judges dangerous situations in order to alert a driver.

Effects of the device are conspicuous as a device of accurately awaken attentiveness to and concentration on prediction and security in surroundings other than a heading direction of the own vehicle, wherein the surroundings largely change depending on specially physiological conditions of the driver.

Embodiment 2

Figure 6:
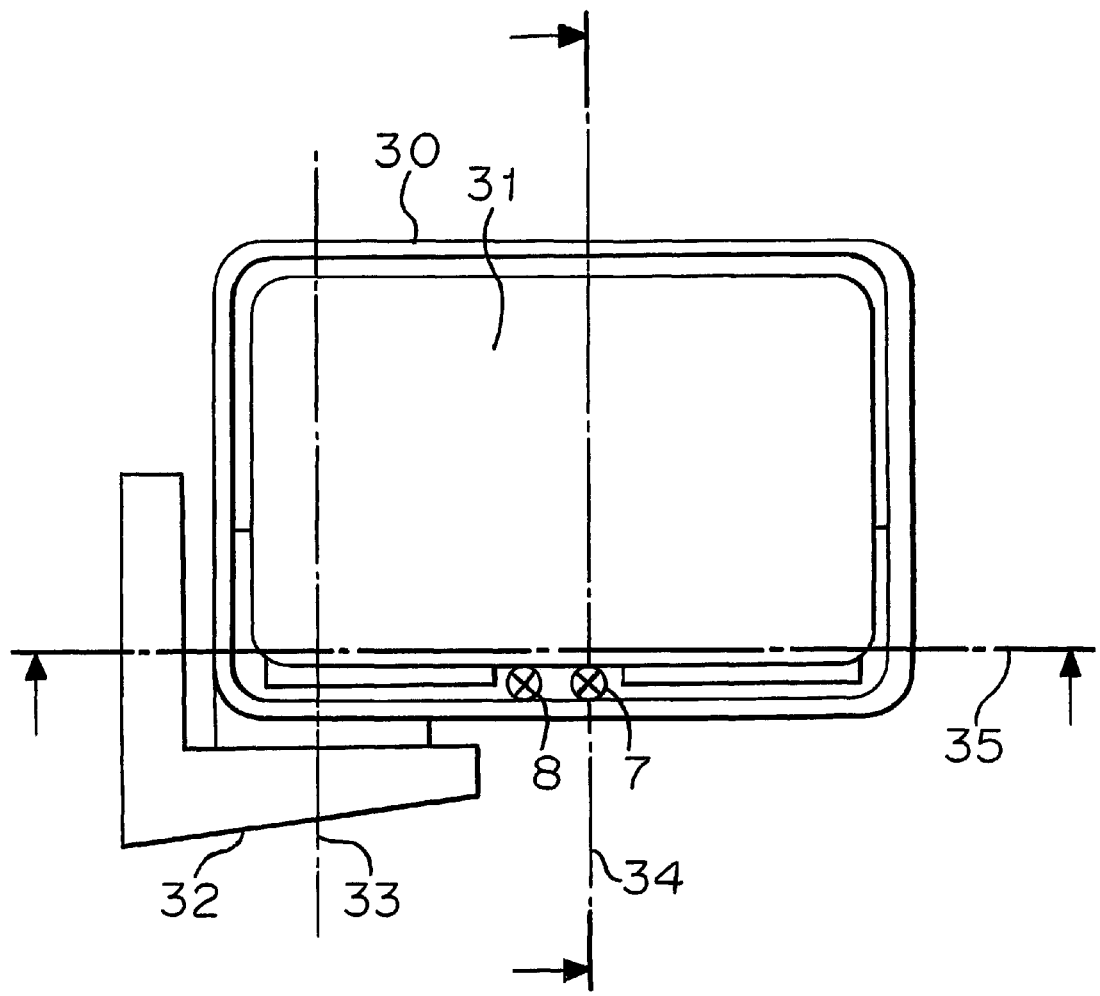
FIG. 6 is a front view of a device for monitoring surroundings of a vehicle and an outer shell casing of door mounted mirror accommodating the device according to Embodiment 2 of the present invention.

In Embodiment 2, a device for monitoring surroundings of vehicle is equipped on a back side of a door mounted exterior mirror within an inside of a door mounted exterior mirror outer shell casing. FIG. 6 is a front view of the device for monitoring surroundings of a vehicle accommodated in the inside of the door mounted exterior mirror according to Embodiment 2 of the present invention.

In FIG. 6, numerical reference 30 designates the door mounted exterior mirror outer shell casing; numerical reference 31 designates a mirror having a filtering property of reflecting visible lights and transmitting electromagnetic waves of several GHz through 100 GHz as described below. Numerical reference 32 designates a supporting member equipped in a body for fixing the body of a vehicle to the door mounted exterior mirror; and numerical reference 33 designates a rotational shaft provided for tilting the door mounted exterior mirror.

Figure 7:
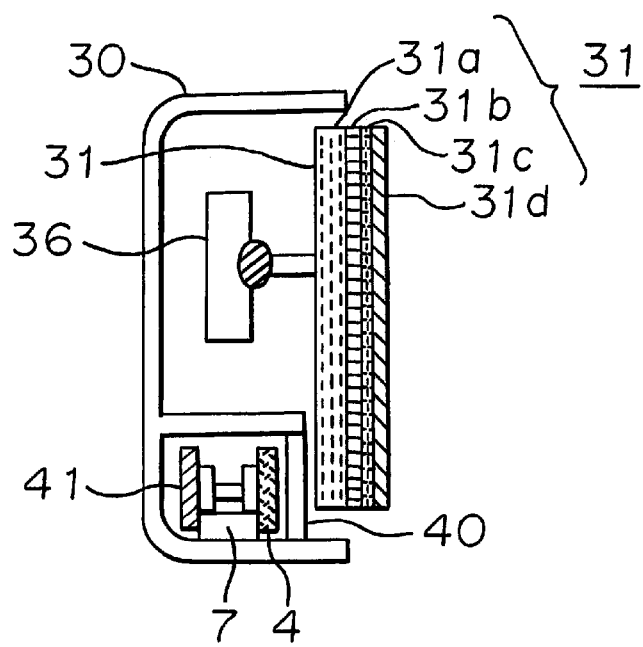
FIG. 7 is a lateral cross-sectional view of the device for monitoring surroundings of vehicle and the outer shell casing of the door mounted exterior mirror accommodating the device according to Embodiment 2 of the present invention.

Numerical reference 34 designates a line, along which a cross-sectional shape in a horizontal direction is taken along in FIG. 7.

Figure 8:
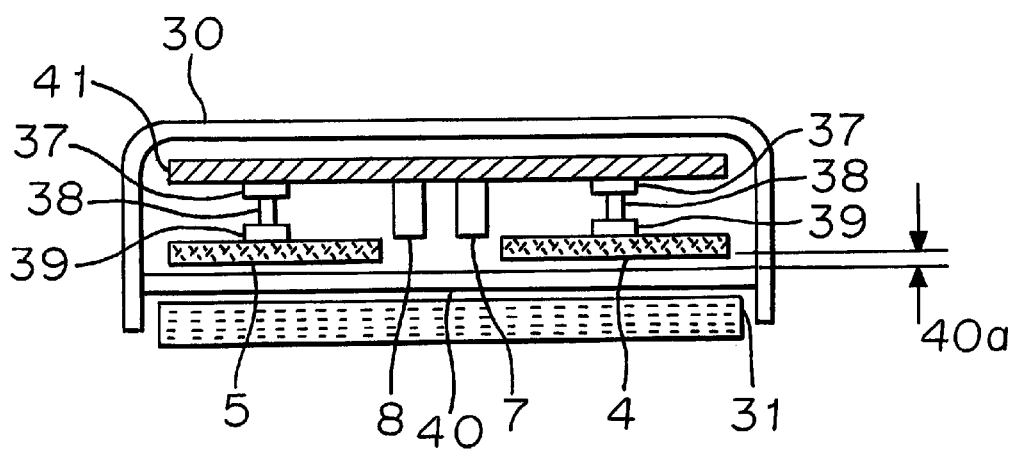
FIG. 8 is a longitudinal cross-sectional view of the device for monitoring surroundings of a vehicle and the outer shell casing of the door mounted exterior mirror accommodating the device according to Embodiment 2 of the present invention.

Numerical reference 35 designates a line, along which a cross-sectional shape in a vertical direction is taken along in FIG. 8.

FIG. 7 is a cross-sectional view of the device for monitoring surroundings of a vehicle, wherein numerical reference 36 designates an actuator for adjusting an angle of a mirror 31 including a supporting member on the body side for fixing the actuator; numerical reference 31a designates a base glass; numerical references 31b, 31c, and 31d respectively designate reflecting films for different wavelengths; numerical reference 31 designates the mirror composed of the base glass 31a, and the reflecting films 31b, 31c, and 31d.

Numerical reference 36 designates a mirror adjusting mechanism. Numerical reference 40 designates a radome, which enables transmission of electromagnetic waves and prevents rain water, dirt, and so on from invading in order to protect an inside of the device. Numerical reference 41 designates an integral substrate, integrally constituted by a power source circuit 1, and operation circuit 2, an electromagnetic wave oscillating circuit 3, and a receiving circuit 6.

FIG. 8 shows a cross-sectional shape in the horizontal direction, wherein numerical references 4 and 5 designate antennas; numerical references 38 designate cables for supplying and transmitting electricity to the antennas 4, 5; numerical references 37 designates connectors provided in the integral substrate 41 for connecting and fixing the cables 38; and numerical references 39 designates connectors provided in bases of the antennas 4, 5 for connecting and fixing the cables 38. Numerical reference 40a designates an interval between the antennas 4, 5 for generating electromagnetic waves and the radome 40, wherein the interval is one wave length.

The mirror 31 will be described in detail. A base material 31a of the mirror 31 is a glass having a refractive index of 1.5 for transmitting electromagnetic waves of several GHz through 100 GHz. Such a base material is fabricated by forming a thin film having a thickness of about a quarter of wave lengths, i.e. a central wavelength of several hundred nanometers, of visible lights on a surface of the base material of the glass 31a using a process of vapor deposition or the like, which thin film does not affect penetration of the above-mentioned microwaves and miliwaves. Practically, the reflection film composed of at least three layers or more corresponding to three colors of wavelengths of 440, 540, and 640 nm is formed on the surface of the base glass 31a.

As described, according to Embodiment 2 of the present invention, because the mirror 31 having the above reflection film is assembled in the radar system as the door mounted exterior mirror, a filter property of reflecting lights having wavelengths in a band of visible light and of transmitting electromagnetic waves is demonstrated. Further, because electromagnetic waves are exchanged through the door mounted exterior mirror, the device for monitoring surroundings of a vehicle is arranged on a back side of the door mounted exterior mirror, whereby a compact structure is realized.

The first advantages of the device for monitoring surroundings of a vehicle according to the present invention is that obstacles are detected by the radar; an occurrence of collisions with these obstacles are judged; and a degree of risk and/or safety is alerted.

The second advantage of the device for monitoring surroundings of vehicle according to the present invention is that a structure of antenna is simplified by integrating the transmitting and receiving antennas; it is not necessary to provide the isolator for separating the transmitting and receiving signals in the electric circuit by independently providing the transmitting antenna and the receiving antenna in order to simplify a circuit structure; and a performance with an excellent signal-to-noise ratio is obtainable.

The third advantage of the device for monitoring surroundings of a vehicle according to the present invention is that assembling, workability, a performance inspection, equipment in a vehicle, a cost and so on become excellent since all elements constituting the device for monitoring surroundings of vehicle are integrated.

The fourth advantage of the device for monitoring surroundings of a vehicle according to the present invention is that the device is equipped at a position suitable for emitting electromagnetic waves around the own vehicle and for monitoring; and it becomes almost unnecessary to consider an exclusive structure and an exclusive shape of the vehicle body for equipping this device, since the door mounted exterior mirror, protruding into an outer space, is utilized to equip all of or a part of the device including the antennas.

The fifth advantage of the device for monitoring surroundings of a vehicle according to the present invention is that obstacles are monitored in a blind spot area of the door mounted exterior mirror.

The sixth advantage of the device for monitoring surroundings of a vehicle according to the present invention is that compactness of the device is realized without spoiling a desirable emitting pattern property of antenna since the interval between the antennas and the radome is set to be a wavelength or a half wavelength of transmitting electromagnetic waves.

Obviously, numerous modifications and variations of the present invention are possible in light of the above teachings. It is therefore to be understood that within the scope of the appended claims, the invention may be practiced otherwise than as specifically described herein.

What is claimed is:

1. A device for monitoring surroundings of vehicle comprising:

a transmitting antenna having a predetermined directivity;

an oscillator for generating electromagnetic waves emitted from said receiving antenna;

a receiving antenna for catching the electromagnetic waves reflected by an object;

a means for receiving signals from said transmitting and receiving antennas and measuring a range from the object based on a time difference between the transmitting and receiving signals and a relative velocity based on a Doppler frequency of the caught electromagnetic waves;

an operating means for judging a degree of risk of colliding with the object based on a result of the measurements obtained by said means for receiving and measuring;

an alarm for notifying a driver the risk based on the degree of the risk judged by said operating means; and a radome arranged in a front of said transmitting and receiving antennas, wherein at least one of intervals between an electromagnetic wave receiving surface of said receiving antenna and an inside of said radome has a size corresponding to about one wavelength or a half wavelength of a period of the oscillated electromagnetic waves.

2. The device for monitoring surroundings of vehicle according to claim 1, wherein a single antenna is commonly used in place of said transmitting and receiving antennas, or said transmitting antenna and said receiving antenna are separate and independent.

3. The device for monitoring surroundings of vehicle according to claim 2, wherein all constitutional elements of the device are integrated.

4. The device for monitoring surroundings of vehicle according to claim 3, wherein the all constitutional elements or at least said transmitting and receiving antennas among the all constitutional elements of the device are equipped in an inside of a door mounted exterior mirror or a peripheral portion of the mirror of a vehicle, in which the device is installed.

5. The device for monitoring surroundings of vehicle according to claim 4, wherein an area of emitting the electromagnetic waves by said transmitting antenna and of receiving the electromagnetic waves reflected by the object by said receiving antenna include a blind spot in a relatively point-blank range, being invisible through said door mounted exterior mirror by the driver in detecting the object approaching from back side to a driver's own vehicle from a relatively far range.

6. The device for monitoring surroundings of vehicle according to claim 2, wherein all constitutional elements or at least said transmitting and receiving antennas among the all constitutional elements of the device are equipped in an inside of a door mounted exterior mirror or a peripheral portion of the mirror of a vehicle, in which the device is installed.

7. The device for monitoring surroundings of vehicle according to 6, wherein an area of emitting the electromagnetic waves by said transmitting antenna and of receiving the electromagnetic waves reflected by the object by said receiving antenna include a blind spot in a relatively point-blank range, being invisible through said door mounted exterior mirror by the driver in detecting the object approaching from a back side to a driver's own vehicle from a relatively far range.

8. The device for monitoring surroundings of vehicle according to claim 1, wherein all constitutional elements of the device are integrated.

9. The device for monitoring surroundings of vehicle according to claim 8, wherein the all constitutional elements or at least said transmitting and receiving antennas among the all constitutional elements of the device are equipped in an inside of a door mounted exterior mirror or a peripheral portion of the mirror of a vehicle, in which the device is installed.

10. The device for monitoring surroundings of vehicle according to claim 9, wherein an area of emitting the electromagnetic waves by said transmitting antenna and of receiving the electromagnetic waves reflected by the object by said receiving antenna include a blind spot in a relatively point-blank range, being invisible through said door mounted exterior mirror by the driver in detecting the object approaching from a back side to a driver's own vehicle from a relatively far range.

11. The device for monitoring surroundings of vehicle according to claim 1, wherein all constitutional elements or at least said transmitting and receiving antennas among the all constitutional elements of the device are equipped in an inside of a door mounted exterior mirror or a peripheral portion of the mirror of a vehicle, in which the device is installed.

12. The device for monitoring surroundings of vehicle according to claim 11, wherein an area of emitting the electromagnetic waves by said transmitting antenna and of receiving the electromagnetic waves reflected by the object by said receiving antenna include a blind spot in a relatively point-blank range, being invisible through said door mounted exterior mirror by the driver in detecting the object approaching from back side to a driver's own vehicle from a relatively far range.

* * * * *